United States Patent [19]

Guy

[11] Patent Number: 4,759,959

[45] Date of Patent: Jul. 26, 1988

[54] REUSABLE PAINT MASKING MEMBER

[75] Inventor: Bruce Guy, Northville, Mich.

[73] Assignee: Mold-Ex Rubber Company, Inc., Farmington, Mich.

[21] Appl. No.: 100,600

[22] Filed: Sep. 24, 1987

Related U.S. Application Data

[63] Continuation of Ser. No. 649,936, Sep. 13, 1984, abandoned.

[51] Int. Cl.⁴ .......................... B32B 25/00; B05D 1/32

[52] U.S. Cl. ..................................... 427/282; 427/287; 427/421; 427/372.2; 427/430.1; 428/447

[58] Field of Search ................ 428/447; 427/282, 287, 427/421, 372.2, 430.1

[56] References Cited

U.S. PATENT DOCUMENTS

| | | | |
|---|---|---|---|
| 2,744,878 | 5/1956 | Smith-Johannsen | 428/447 |
| 2,789,155 | 4/1957 | Marshall et al. | 428/447 |
| 4,420,520 | 12/1983 | Jones et al. | 428/195 |

*Primary Examiner*—Paul J. Thibodeau
*Attorney, Agent, or Firm*—Myron B. Kapustij

[57] ABSTRACT

Reusable paint masking member for automobile bodies comprised of an organopolysiloxane elastomer.

14 Claims, 1 Drawing Sheet

REUSABLE PAINT MASKING MEMBER

This is a continuation, of application Ser. No. 649,936, filed Sept. 13, 1984, now abandoned.

BACKGROUND OF THE INVENTION

The use of paint masking members in the painting of automobile body parts is well known. These masking members are applied onto an automobile body part, such as a bumper, which is to be painted and serve to keep a desired portion of said body part free of paint. Due to the fact that in painting automobile body parts the paint is usually applied by spray painting or dipping, and the painted part is then exposed to rather high tempertaures in order to bake on the paint it is necessary that there be a paint tight seal between the edges of the masking member and the substrate onto which it is applied, and that the masking member be able to withstand the high baking temperatures.

The conventional masking members are fabricated from paper, tape such as adhesive tapes, metals such as aluminum, and fiberglass. Each of these conventional masking members has certain drawbacks and disadvantages associated therewith. Thus, for example, the tape and paper masking members are generally not reusable and require a great deal of time and effort to apply correctly onto the article to be painted. The masking members fabricated from metals and fiberglass, while lending themselves to reuse, suffer from the disadvantages of being rigid and thus tending to break, having a thermal expansion which is often quite different from that of the part being painted. This difference in coefficient of thermal expansion results in a space being formed between the edges of the masking member and the substrate part, thereby allowing paint to creep into said space. Furthermore, these conventional fiberglass and metal masking members also require a geart deal of time and effort to apply correctly onto the part to be painted.

There thus exists a need for a masking member which is reusable, is readily and easily applied onto the substrate to be painted, and has a coefficient of thermal expansion which is generally similar to that of the substrate to be painted, particularly to that of plastic automobile body parts such as plastic bumpers. It is an object of the instant invention to provide such as masking member.

FIELD OF THE INVENTION

The instant invention is directed to masking members for use in the painting of automobile body parts, particularly plastic automobile body parts such as bumpers.

SUMMARY OF THE INVENTION

In accordance with the instant invention there is provided an elastomeric reusable shaped masking member comprised of an organopolysiloxane rubber.

DESCRIPTION OF THE INVENTION

Figure 1:
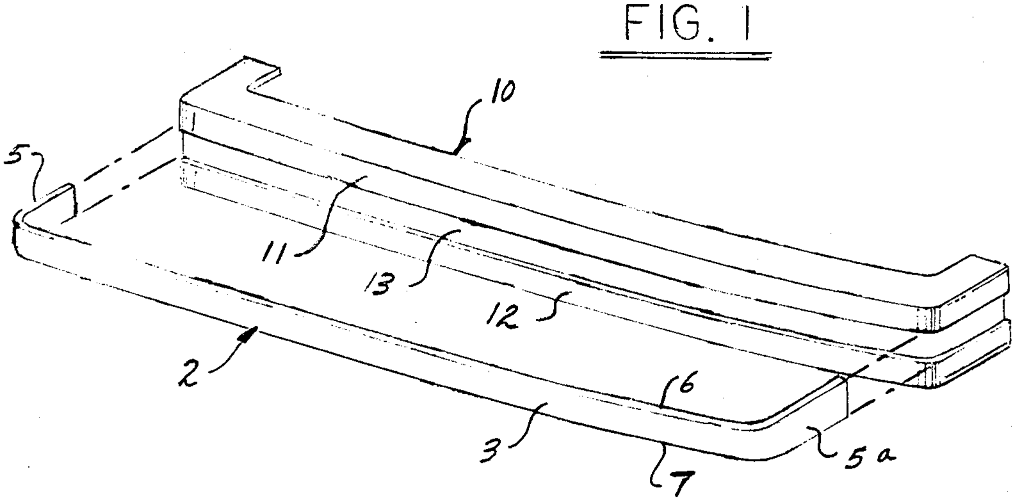
FIG. 1 is an exploded prespective view of the masking member and an automobile bumper onto which it is applied.

The instant invention is directed to novel masking members for use in masking automobile body parts, particularly plastic automobile bumpers, which are to be painted. The instant masking members exhibit the following characteristics:

(i) they are elastomeric and somewhat flexible;
(ii) they exhibit a paint release surface;
(iii) they are capable of continued reuse;
(iv) they are shaped to conform to the substrate onto which they are applied;
(v) they are heat stable up to temperatures of about 400° F.;
(vi) they exhibit a coefficient of thermal expansion which is generally similar to that of the plastic substrates onto which they are applied; and
(vii) they provide a tight paint-proof seal between their outer edges and the substrate onto which they are applied.

In order for the masking members of the instant invention to function effectively they must posses each one of the aforedescribed characteristics.

They must be elastomeric, and flexible so that they may be easily applied onto the fabricated part to be painted, fit tightly thereon, and conform to the shape thereof.

They must exhibit a paint release surface so that there is not an excessive build up of paint on them which may deleteriously affect the paint-tight fit between their outer edges and the surface of the substrate to be painted. If this paint-tight seal is adversely affected there will be creeping of paint between these edges and the surface of the substrate, thereby allowing paint to be deposited onto the areas which it is desired to keep paint-free.

They must be heat stable up to temperatures of about 400° F. This is due to the fact that the paint is baked or cured at temperatures of up to about 400° F.

They must exhibit a coefficient of thermal expansion which is generally similar to that of the plastic body parts onto which they are applied. If the coefficient of thermal expansion is significantly different there will be a contraction or expansion of the masking member which is different from that of the substrate during the baking process. This may result in the seal between the edges of the masking member and the surface of the substrate being broken, thus allowing the paint to creep in under the masking member and depositing on the area which it is desired to be kept paint-free.

As illustrated in the embodiment shown in the drawings the masking member 2 of the instant invention is comprised of a narrow longitudinally extending main body portion 3 and two side sections 5 and 5*a* disposed at the ends of the main body portion 3. These two side sections 5 and 5*a* are bent at a 90° angle to the main body portion 3. The masking member thus conforms to the shape of the bumper upon which it is temporarily and removably mounted. The main body portion 3 and the two side sections 5 and 5*a* all have two edges, a top edge 6 and a bottom edge 7, which form a paint-proof seal between the substrate and the masking member 2. The substrate 10 illustrated in the drawings ia an automobile bumper. This bumper 10 is to be painted at areas 11 and 12, and is to be free of paint at area 13, onto which masking member 2 is applied and which said masking member masks.

Figure 2:
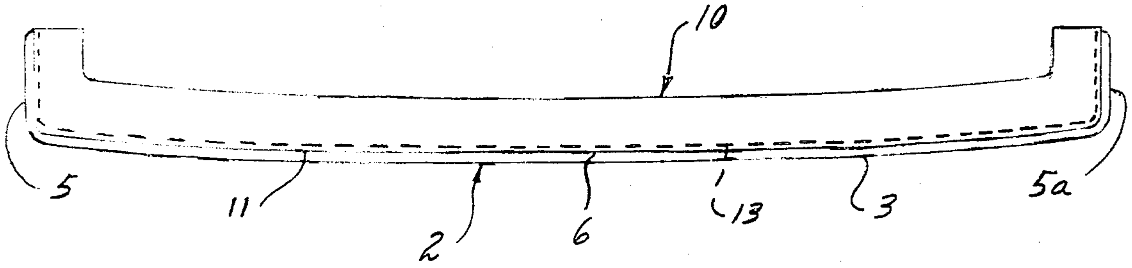
FIG. 2 is a plan view of the masking member mounted on an automobile bumper.

In actual practice the masking member of the embodiment illustrated in FIGS. 1 and 2 is first mounted onto bumper 10 so as to mask area 13. The masking member is merely fitted onto the bumper and is held in palce by the inward pressure exerted by the two side sections 5 and 5*a*. The bumper is then spray painted and the painted bumper, with the masking member 2 thereon, is placed in a baking oven to cure the paint. The painted and dry bumper is then removed from the oven and the masking member is removed from the bumper for further use. After several painting the paint which has accumulated on the surface of the masking member is easily removed therefrom, due to the masking member having a paint release surface, by merely peeling it off.

Because the masking member is elastomeric and somewhat flexible, it fits tightly over the bumper, stays in place readily, and forms a paint-tight seal between its edges 6 and 7 and the surface of the bumper.

It is to be understood that the masking member 2 need not have the shape illustrated in FIGS. 1 and 2. The shape of the masking member may be varied according to the shape of the bumper onto which it is applied. Thus, for example, some of the masking members may not have the end sections 5 and 5*a* and may merely contain a straight longitudinally extending main body portion 3.

Furthermore, the masking member of the instant invention may be held in place on the bumper by various mechanical means such as clamps, screw and bolt means extending from the bumper through appropriate openings in the masking member, and the like.

The bumper 10 is normally fabricated from a paintable plastic material such as, for example, polyurethane, both thermoplastic polyurethane and thermoset polyurethane, polyolefins such as polyethylene and polypropylene, high density polyethyelene, and the like. Due to the material from which the masking member 2 is fabricated, as described hereinafter, the coefficients of thermal expansion of the masking member 2 and the bumper 10 are generally similar. Due to this similarity the masking member and the bumper expand and contract at substantially the same rate and to substantially the same degree upon heating and cooling. Therefore the integrity of the paint-tight seal between the edges 6 and 7 of the masking member and the surface of the bumper 10 is maintained during the baking of the painted bumper, thereby insuring that there is no creeping of the paint under the edges of the masking member onto area 13 of the bumper. That is to say the edges of the masking member remain in intimate contact with the surface of the bumper during the entire painting and curing operation.

The masking member 2 is fabricated from and is comprised of an elastomeric or rubbery organopolysiloxane. More particularly, the organopolysiloxanes useful in the preparation of the masking members of the instant invention are the organopolysiloxane elastomers or rubbers which are comprised of high molecular weight generally linear polymers having a slight degree of crosslinking.

In general, these organopolysiloxanes contain relatively long chains comprised of recurring diorganosiloxane structural units.

These organopolysiloxane rubbers or elastomers are well known in the art and are generally commercially readily available from a variety of sources such as, for example, from the Dow Corning Company and the General Electric Company.

The instant organopolysiloxane elastomers or rubbers are generally obtained by curing or vulcanizing further curable or vulcanizable organopolysiloxane compositions. These compositions, in addition to containing a furher curable or vulcanizable organopolysiloxane, also contain curing or crosslinking agents.

While it is possible to utilize both the room temperature curable or vulcanizable silicone elastomers or rubbers (the so-called RTV silicone elastomers or rubbers) and the heat curable silicones, the preferred organopolysiloxane rubbers or elastomers are the heat curable organopolysiloxane rubbers or elastomers. These silicone rubbers are described, inter alia, in Billmeyer, Jr., F. *Textbook of Polymer Science,* Interscience Publishers, 1966, New York, N.Y., pp. 482, which is hereby incorporated herein by reference.

Generally these organopolysiloxanes are diorganopolysiloxanes which may be represented by the general formula $$Z'_nSiR'_{3-n}O(SiR'_2O)_xSiR'_{3-n}Z'_n$$

in which each R' represents an unsubstituted monovalent hydrocarbon radical, a substituted monovalent hydrocarbon radical, a substituted or unsubstituted polymeric hydrocarbon radical, Z' represents a hydrolyzable group, a hydrolyzable atom, a hydroxy group, or an alkenyl group, n represents 1, 2 or 3, and x represents a positive integer. The diorganopolysiloxanes may also contain, within or along with the siloxane chains, a small amount of siloxane units other than the diorganosiloxane units, such as units of the formulae $R'SiO_{3/2}$, $R'_3SiO_{\frac{1}{2}}$, and $SiO_{4/2}$. Such units are generally present only as impurities and are generally preferably present in an amount less than about 10 mole percent.

Examples of unsubstituted monovalent hydrocarbon radicals represented by R' are alkyl radicals, e.g., methyl, propyl, butyl, hexyl, octyl, and the like; alkenyl radicals, e.g., vinyl, allkyl, ethallyl, butadienyl, and the like; aryl radicals, e.g., phenyl; and alkaryl radicals, e.g., toyl and the like. Examples of preferred substituted monovalent hydrocarbon radicals are halohydrocarbon radicals, e.g., 3,3,3-trifluoropropyl, chlorophenyl, and bromotolyl radicals; and cyanoalkyl radicals, e.g. beta-cyanoalkyl radicals. Examples of unsubstituted and substituted polymeric (or modifying) hydrocarbon radicals are homopolymeric and copolymeric chains derived from one or more olefinically unsaturated monomers, e.g., styrene, vinyl acetate, n-butyl acrylate, n-butyl methacrylate and acrylonitrile. These polymeric radicals are linked to the silicon atom on the siloxane chain via a carbon-carbon linkage.

Preferably at least about 50 percent of the radicals represented by R' are methyl radicals, since these are more readily available. Other radicals represented by R' are preferably phenyl or vinyl radicals.

The hydrolyzable atoms or groups represented by Z' include, but are not limited to, amino, aminoxy, oximo, hydrocarbonoxy, alkoxyalkyl, acyloxy and phosphato groups. Suitable amino groups are, for example, n-butylamino, sec-butylamino and cyclohexylamino groups. An example of suitable acylamino group is a benzoylmethylamino group. Suitable aminoxy groups are, for example, dimethylaminoxy, diethylaminoxy, dipropylaminoxy, dibutylaminoxy, dioctylaminoxy, diphenyl aminoxy, and methylphenylaminoxy groups. Suitable oximo groups are, for example, acetophenone oxime, acetone oxime, benzophenone oxime, methyl ethyl ketoxime, and diisopropyl ketooxime groups. Suitable examples of hydrocarbonoxy groups are alkoxy groups having up to 10 carbon atoms, e.g., methoxy, ethoxy, n-propxy, butoxy, and octyloxy groups. Other hydrocarbonoxy groups having having up to 10 carbon atoms include, for example, vinyloxy, allyloxy, ethylallyloxy, isopropenyloxy, butadienyloxy and phenoxy groups. A suitable alkoxyalkoxy group is, for example, a methoxyethoxy group. Preferred acyloxy groups are those having up to 18 carbon atoms, e.g., formloxy, acetoxy, propionoxy, valeroyloxy, caproyloxy, myristyloxy and stearoyloxy groups. Suitable phosphato groups are, for example, dimethylphosphato, diethylphosphato, dibutylphosphato, methylphenylphosphato and diphenylphosphato groups. Hydrolyzable atoms represented by Z′ are, for example, hydrogen atoms and halogen atoms such as the chlorine atoms.

Alkenyl groups represented by Z′ are preferably vinyl groups.

Mixtures of two or more diorganopolysiloxanes may be used in the formation of the organopolysiloxane elastomers.

Organopolysiloxane compositions containing diorganopolysiloxanes terminated by hydrosiloxy groups, that is those in which Z′ represents a hydroxy group (in which case n usually represents one), also contain a crosslinking agent. The crosslinking agent is preferably a silicon compound containing at least three condensable atoms and/or groups pre molecule.

A preferred crosslinking agent is a silane of the general formula $$R''_{4-t}SiZ_t$$

in which R″ represents a substituted or unsubstituted monovalent hydrocarbon radical having from 1 to 18 carbon atoms and Z represents a hydrolyzable atom or group, and t represents 3 or 4. Examples of unsubstituted monovalent hydrocarbon radicals are alkyl radicals, such as for example, methyl, ethyl, propyl, butyl, octyl, decyl and octadecyl radicals; alkenyl radicals such as vinyl and allkyl; aryl radicals such as the phenyl radical; and alkaryl radicals such as the tolyl radical. Examples of substituted monovalent hydrocarbon radicals are the halogenated hydrocarbon radicals such as 3,3,3-trifluoropropyl, chlorophenyl and bromotolyl radicals and cyanoalkyl radicals such as the beta-cyanoethyl radical.

Examples of suitable silanes represented by the above formula are methyltriethoxysilane, tetraethoxysilane, methylbutoxydiethoxysilane, methyltris(methoxyethoxy)silane, methyltriacetoxysilane, isopropyltriacetoxysilane, isopropoxytriacetoxysilane, vinyltriacetoxysilane, and vinyltriacetoxysilane.

Another suitable crosslinking agent, which may be use instead of or in conjunction with, a silane of the type described hereinafore is a polysiloxane containing at least three silicon-bonded atoms or groups represented by Z per molecule, in which any other unsatisfied silicon valences are satisfied by siloxane oxygen atoms or, optionally, by a radical represented by R″. Examples of such crosslinking agnets are polyethysilicate having an $SiO_2$ content of about 40 percent by weight, hexaethoxydisilane and methylhydrogenpolysiloxane.

In addition to the cross-linking agents previously described the compositions can contain the free radical curing or cross-linking agents such as, for example, t-butyl peroctoate, isopropyl percarbonate, benzoyl peroxide, 2,4-dichlorobenzoyl peroxide, methyl ethyl ketone peroxide, cumene hdroperoxide, and dicumyl peroxide.

Organopolysiloxane compositions which contain diorganopolysiloxanes in which Z′ represents a hydrolyzable group or atom or a hydroxy group, also preferably contain a condensation catalyst. An example of a suitable condensation catalyst is dibutyltin dilaurate.

The organopolysiloxane elastomers or rubbers also have admixed therewith inert fillers such as, for example, pyrogenically produced silicon dioxide (fume silica), aluminum silicate, polyvinyl chloride powder, talc, mica, clay, and glass fibers. These compositions may also contain dyes or colorants, corrosion inhibitors, plasticizers such as trimethoxysiloxy terminated dimethylpolysiloxanes, and the like.

In order to provide the required degree of stiffness and resistance to tearing the organopolysiloxanes have admixed therewith the aforedescribed fillers. Generally the amount of filler present, based on the total amount of filler and organopolysiloxane elastomer or rubber, is from about 5 to about 50 weight percent, preferably from about 10 to about 45 weight percent, and more preferably from about 15 to about 35 weight percent.

The masking members of the instant invention are generally prepared by modling the further curable organopolysiloxane compositions containing the filler into the desired sahpe and thereafter curing these shaped compositions into the filled organopolysiloxane elastomers.

The shaping process can be accomplished by placing the further curable organopolyslioxane compositions containing the requisite amount of filler onto a preformed mold, and thereafter curing the shaped composition as, for example, by placing the mold covered with the further curable filled organopolysiloxane composition into a curing oven. The cured elastomer is then removed from the mold and is ready for use as a masking member.

Particularly useful organopolysiloxane elastomers are those containing recurring structural units represented by the general formula

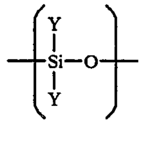

wherein Y is indepenedently selected from methyl radicals, phenyl radicals, and vinyl radicals. The preferred radicals represented by Y are the vinyl and methyl radicals. That is to say, the preferred organopolysiloxane elastomer is a diorganopolysiloxane containing methyl and vinyl radicals as the organic units.

It will thus be seen that the objects set forth above, among those made apparent from the preceding description, are efficiently attained, and since certain modifications may be made in carrying out the invention as set forth without departing from the scope of the invention, it is intended that all matters contained in the above description shall be interperted as illustrative and not in a limiting sense.

What is claimed is:

1. A method for keeping the exposed surface of a selected automobile body member unpainted during the painting process of an automobile body comprising the steps of:

(i) applying a paint masking element onto the surface of said member which is to remain unpainted, said masking element being (a) reusable, (b) removable, (c) preformed, (d) of a shape conforming to the shape of the exposed surface of said member and adapted to fit over and fitting over the exposed surface of said member, and (e) comprised of a cured elastomeric organopolysiloxane;

(ii) applying paint onto the automobile body, including the surface of said member having said masking element disposed thereon;

(iii) terminating the application of paint onto the automobile body; and (iv) removing said masking element from said member.

2. The method of claim 1 which further includes, between steps (iii) and (iv), the step of curing the paint which has been applied onto the automobile body.

3. The method of claim 1 wherein step (ii) comprises spray painting.

4. The method of claim 1 wherein step (ii) comprises dip painting.

5. The method of claim 1 wherein said paint masking element has a surface exhibiting paint release properties.

6. The method of claim 1 wherein said paint masking element exhibits both vertical and horizontal extensibility.

7. The method of claim 1 wherein said paint masking element is heat stable up to a temperature of about 400°.

8. The method of claim 1 wherein said organopolysiloxane is a diorganopolysiloxane.

9. The method of claim 8 wherein said diorganopolysiloxane is methyl-vinyl diorganopolysiloxane.

10. The method of claim 1 wherein said organopolysiloxane contains a filler.

11. The method of claim 10 wherein said filler is a mineral filler.

12. The method of claim 10 wherein said filler is present in from about 5 to about 50 weight percent based on the total amount of filler and organopolysiloxane.

13. The method of claim 1 wherein said member is an automobile bumper.

14. The method of claim 13 wherein said paint masking element is adapted to fit and fits over and covers the exposed surface of an automobile bumper.

* * * * *